United States Patent [19]

MacPherson

[11] Patent Number: 5,224,430
[45] Date of Patent: Jul. 6, 1993

[54] SECURITY ENCLOSURES

[75] Inventor: Hugh MacPherson, Fife, Scotland

[73] Assignee: W. L. Gore & Associates, Inc., Newark, Del.

[21] Appl. No.: 900,566

[22] Filed: Jun. 18, 1992

[30] Foreign Application Priority Data

Jun. 21, 1991 [GB] United Kingdom ............... 9113455

[51] Int. Cl.⁵ .............................................. G08B 13/00
[52] U.S. Cl. ...................................... 109/42; 428/915; 428/916; 206/459.1; 206/807; 340/550
[58] Field of Search ....................... 109/31–38, 109/40, 41, 42, 49.5; 340/550; 361/398; 428/915, 916; 206/459.1, 807

[56] References Cited

U.S. PATENT DOCUMENTS

| | | | |
|---|---|---|---|
| 3,594,770 | 7/1971 | Ham | 340/550 |
| 3,763,795 | 10/1973 | Wetz, Jr. | 340/550 |
| 3,772,674 | 11/1973 | Jackson | 206/459.1 |
| 4,785,743 | 11/1988 | Dalphin | 109/40 |
| 4,972,175 | 11/1990 | MacPherson | 340/550 |
| 5,014,162 | 5/1991 | Clark et al. | 361/398 |

FOREIGN PATENT DOCUMENTS

| | | |
|---|---|---|
| 277679 | 8/1988 | European Pat. Off. . |
| 2234621 | 1/1975 | France ............... 340/550 |
| 1375926 | 12/1974 | United Kingdom . |
| WO83/00246 | 1/1983 | World Int. Prop. O. .......... 340/550 |
| WO87/06749 | 11/1987 | World Int. Prop. O. . |

Primary Examiner—Peter M. Cuomo
Assistant Examiner—Darnell M. Boucher
Attorney, Agent, or Firm—Gary A. Samuel

[57] ABSTRACT

A security enclosure comprises a flexible sheet of insulating material extending over the whole of the area of the enclosure and carrying lines of electrically-responsive material on each side. The lines on one side of the sheet extend obliquely relative to the lines on the other side of the sheet and are connected thereto at edge portions of the sheet to form a plurality of conductors so dividing the sheet into a number of relatively small areas so that attempted opening of the enclosure changes an electrical characteristic of the conductors. Connectors are provided at an edge portion of the sheet for individually connecting the conductors to a detector for detecting the changes in the electrical characteristic of the lines. The connectors include a switch arrangement which is selectively configured to connect further connectors associated with the detector with selected conductors. One edge portion of the sheet includes a plurality of line switches which are selectively configured to connect each one of the lines on one side of the sheet with a selected one of a plurality of lines on the other side of the sheet.

22 Claims, 11 Drawing Sheets

SECURITY ENCLOSURES

FIELD OF THE INVENTION

This invention relates to security enclosures and more particularly to security enclosures for giving warning, or destroying or erasing information, if interference is made with the enclosure with the aim of gaining access to an object within the enclosure. The invention also relates to sheets and laminates for use in making such enclosures.

BACKGROUND OF THE INVENTION

It is known to provide security enclosures with walls or sheets incorporating coils, meshes or grids of electrically responsive material and to monitor certain electrical characteristics of the material to provide an indication when the sheets containing the material have been pierced or an attempt has been made to open the enclosure through other means. A relatively simple example of such an enclosure is disclosed in PCT International Application Publication Number WO87/06749, to Wolf, which relates to an alarm system particularly intended for "curtainsider" type vehicles. The system includes a flexible sheet carrying a network of closely spaced, readily frangible conductors, the alarm being operable in response to breaking a conductor upon attempting to cut or lift the sheet.

A somewhat more sophisticated security container is disclosed in UK Patent Number 1,375,926 to GAO Gesellschaft Fur Automation und Organisation mbH. The patent discloses a security container provided with a wall including one or more looped electrical conductors which are connected to a circuit which monitors current passing through the loops.

A somewhat different approach is taken in U.S. Pat. No. 4,785,743 to Dalphin, which relates to a protected room. The patent is particularly directed to electronic bank tellers and in particular the protection of the keyboard where a user supplies an access code. Such keyboards utilise an interrupter assembly and represent a weak point in the protective wall of the apparatus. The invention relates to the provision of parallel conductive sub tracks beneath the key pad. Movement activating the interrupter, as would occur from a user pressing a number on the key pad, has an equal effect on the conductivity of the two sub tracks, while an attempt at unauthorised intrusion has an unequal effect on the conductivity of the tracks. A balanced Wheatstone bridge is coupled to the sub tracks and is used to detect any unequal effect on the conductivity of the tracks.

European Patent Publication Number 277 679 to Seculock BV discloses a device for the protected storage of objects and includes a system including a layer of electrically conducting material provided with two electrodes which are connected to a processing circuit and are mounted at a distance from one another on the layer. The processing circuit monitors the resistance of the layer, which changes if any attempt is made to penetrate the layer.

However, the present invention is more closely related to the security enclosure disclosed in UK Patent Application GB2220513A, to W. L. Gore & Associates Inc. The disclosed security enclosure is formed from layers of flexible material including a matrix of diagonally extending semi-conductive lines printed on to a rectangular thin insulating film. The matrix of lines forms a continuous conductor which is broken if attempts are made to penetrate the film. The circuit is monitored by opening the conductor at one point and measuring the change of resistance between the two ends of the circuit.

SUMMARY OF THE INVENTION

According to a first aspect of the present invention there is provided a security enclosure comprising a flexible sheet of insulating material extending over the whole of the area of the enclosure and carrying lines of electrically responsive material on each side. The lines on one side of the sheet extend obliquely relative to the lines on the other side and are connected thereto at edge portions of the sheet to form a plurality of conductors so dividing the sheet into a number of relatively small areas that attempted opening of the enclosure changes an electrical characteristic of the lines. Connecting means are provided at an edge portion of the sheet for individually connecting the conductors to detecting means for detecting changes in an electrical characteristic of the lines. The connecting means includes switch means which are selectively configured to connect connectors associated with the detecting means with selected conductors.

In use, the electrical characteristic of each conductor is individually monitored by the detecting means, through the connecting means, and changes in electrical characteristics caused by attempted penetration of the flexible sheet will, for example, sound an alarm or destroy or erase information contained within the enclosure. The ability to link the individually monitored conductors to different detecting means connectors increases the difficulties encountered by a potential intruder in attempting to gain entry to the enclosure. In some circumstances an intruder may have previously obtained a similar enclosure, and through disassembly of the enclosure have discovered the mode of operation of the conductors and detection means. It may then be possible for the intruder to develop means for isolating individual conductors from the detecting means. If, in a particular example, each conductor is subject to a particular, monitored reference potential (depending on the associated detecting means connector) the intruder may be able to mimic the monitored potential drop across each conductor and thus be able to isolate the conductors from the detecting means and thus safely cut the conductors to assist in gaining access to the enclosure. If all enclosures were identical, the intruder, by examination of one enclosure, might be able to map the conductors and identify the monitored electrical characteristic associated with each conductor. However, using the present invention, each conductor may be connected to any one of a plurality of detecting means connectors, and thus the monitored electrical characteristic of each conductor may be varied for each enclosure.

Preferably, more than two conductors are provided, the higher the number of conductors being provided, the greater the number of permutations of connections being possible. The number of detecting means connectors may equal the number of conductors, or one connector may serve a plurality of conductors. Also, the switch means may be configured to interconnect a plurality of different conductors such that a single detecting means connector serves a plurality of conductors and the detecting means monitors an electrical characteristic of the interconnected conductors.

Preferably also, the lines of electrically responsive material are of semi-conductive material. The lines need not be straight and for example, may be wavy.

Preferably also, the lines (whether straight or curved) of electrically responsive material are arranged in generally parallel arrays and thus divide the sheet into a matrix of generally diamond-shaped areas.

Preferably also, the lines on one side of the sheet are connected to the lines on the other side of the sheet at spaced points along the edges of the sheet, the points on one side of the sheet being in register with the points on the other side of the sheet. Most preferably, the lines on opposite sides of the sheet are interconnected at each pair of registering points by a semi-conductive or conductive material extending through a hole formed through the sheet and the registering points.

According to a further aspect of the present invention there is provided a security enclosure comprising a flexible sheet of insulating material extending over the whole of the area of the enclosure and carrying lines of electrically responsive material on each side. The lines on one side extend obliquely relative to the lines on the other side and are connected thereto at edge portions of the sheet to form a plurality of conductors so dividing the sheet into a number of relatively small areas that attempted opening of the enclosure changes an electrical characteristic of the conductors. One edge portion of the sheet includes a plurality of line switch means which are selectively configured to connect each one of the lines on one side of the sheet with a selected one of a plurality of lines on the other side of the sheet. Connecting means are provided for connecting ends of the conductors to detecting means for detecting changes in an electrical characteristic of the conductors.

The provision of the line switch means permits similar enclosures to be provided with sheets on which the configuration of conductors varies, simply by varying the configuration of the line switch means.

When this further aspect of the present invention is combined with the abovementioned first aspect of the invention, it is possible to provide similar enclosures provided with a very large number of permutations of conductor configuration and connection configuration.

Preferably, the lines on one side of the sheet are connected to the lines on the other side of the sheet at spaced points along the edges of the sheet, the points on one side of the sheet being in register with the points on the other side of the sheet. At the edge portion provided with the line switch means, each line on one side of the sheet overlies a plurality of lines on the other side of the sheet, a point being provided on each side of the sheet at the location of each overlap, but only one point on each line providing a connection . Most preferably, the lines on opposite sides of the sheet are interconnected at each pair of connected registering points by a semi-conductive or conductive material extending through a hole formed through the sheet and the registering points.

Preferably also, the lines of electrically responsive material are arranged in parallel arrays and thus divide the sheet into a matrix of diamond-shaped areas.

BRIEF DESCRIPTION OF THE DRAWINGS

These and other aspects of the present invention will now be described, by way of example, with reference to the accompanying drawings, in which:

FIG. 9(a)-(f) are an enlarged view of a further portion of FIG. 5;

DETAILED DESCRIPTION OF DRAWINGS

It should be noted that FIGS. 1–4 do not include the main aspects of the present invention which will be described below, with reference to FIGS. 5–10. FIGS. 1–4 are used to describe the basic principles of operation and construction of sheets and laminates of this form, and to provide a basis for a clearer understanding of the present invention.

Figure 1:
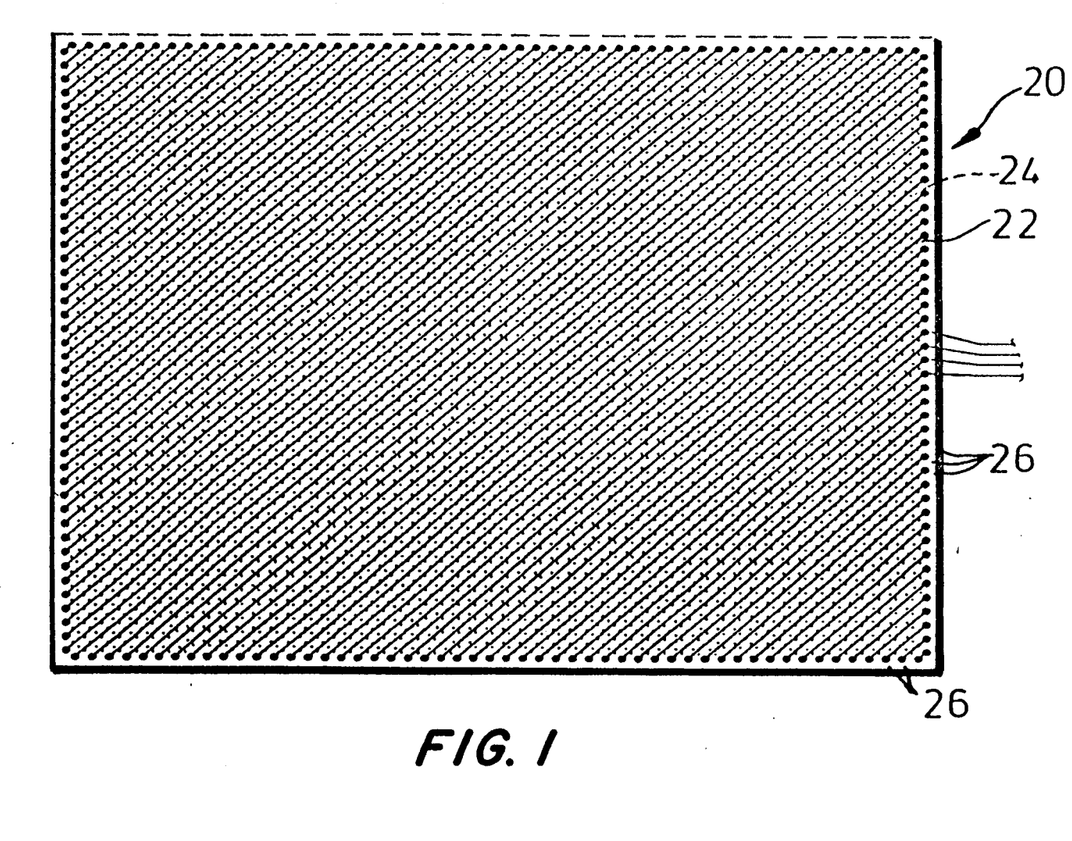
FIG. 1 is a schematic plan view of a flexible sheet for use in forming a security enclosure.

Reference is first made to FIG. 1 of the drawings which illustrates, somewhat schematically, a flexible sheet 20 for use in forming a security enclosure. The sheet 20 is of insulating material and carries lines 22, 24 of electrically responsive material on each side, the lines on the underside being shown as broken lines. The lines 22, 24 extend diagonally across the sheet 20 and the lines on one side extend obliquely relative to the lines on the other side to divide the sheet into a matrix of diamond-shaped areas. Each line 22, 24 terminates at each end, at an edge portion of the sheet 20, in a point or pad 26, the pads on each side being in register with the pads on the other side of the sheet. Two pairs of registering pads 26a, 26b, may be seen in FIGS. 2 and 3 of the drawings. A connection between the lines is provided at the pads 26a by forming a hole 28 through the sheet such that when the lines 22, 24 are formed, preferably by printing, the semi-conductive ink used to form the lines on one side extends through the hole 28 into contact with the lines on the other side. In practice, the lines are printed on one side of the sheet before the holes are formed. The holes are then punched in the sheet and the connecting hole lining 30 is formed when the second set of lines are printed on the other side of the sheet.

The matrix of lines 22, 24 are so connected to form a number of loops or conductors, which will be broken if an attempt is made to penetrate the film, by cutting, abrasion, application of solvents, or application of heat.

Figure 2:
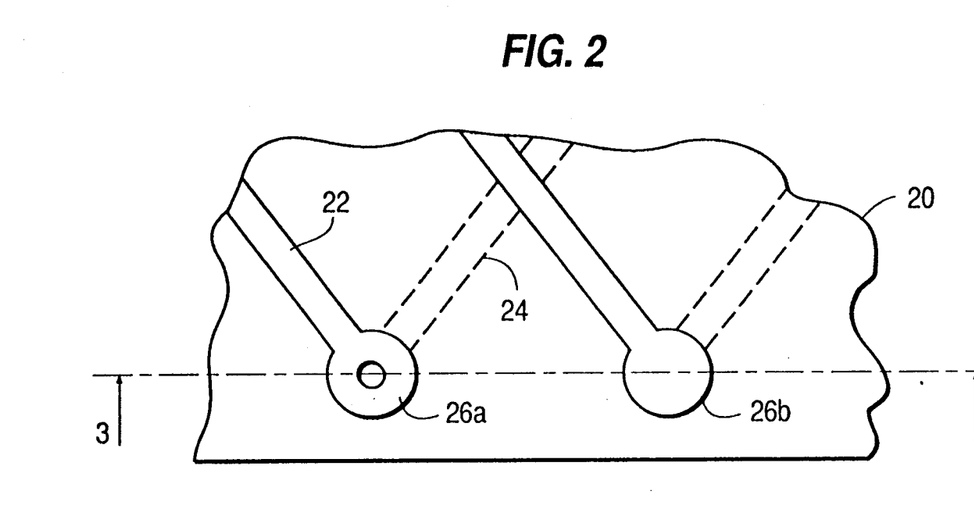
FIG. 2 is an enlarged view of a portion of the edge of the sheet of FIG. 1.
Figure 3:
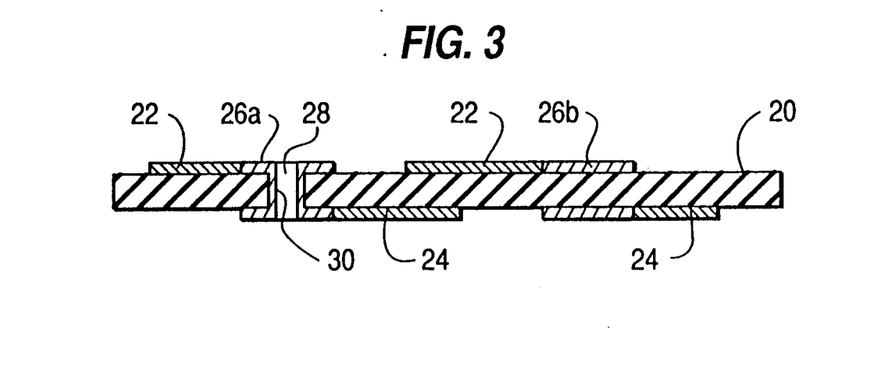
FIG. 3 is a sectional view on line 3—3 of FIG. 2.

It will be seen that pads 26b are devoid of a through hole in that there is no interconnection between lines at pads 26b.

Figure 4:
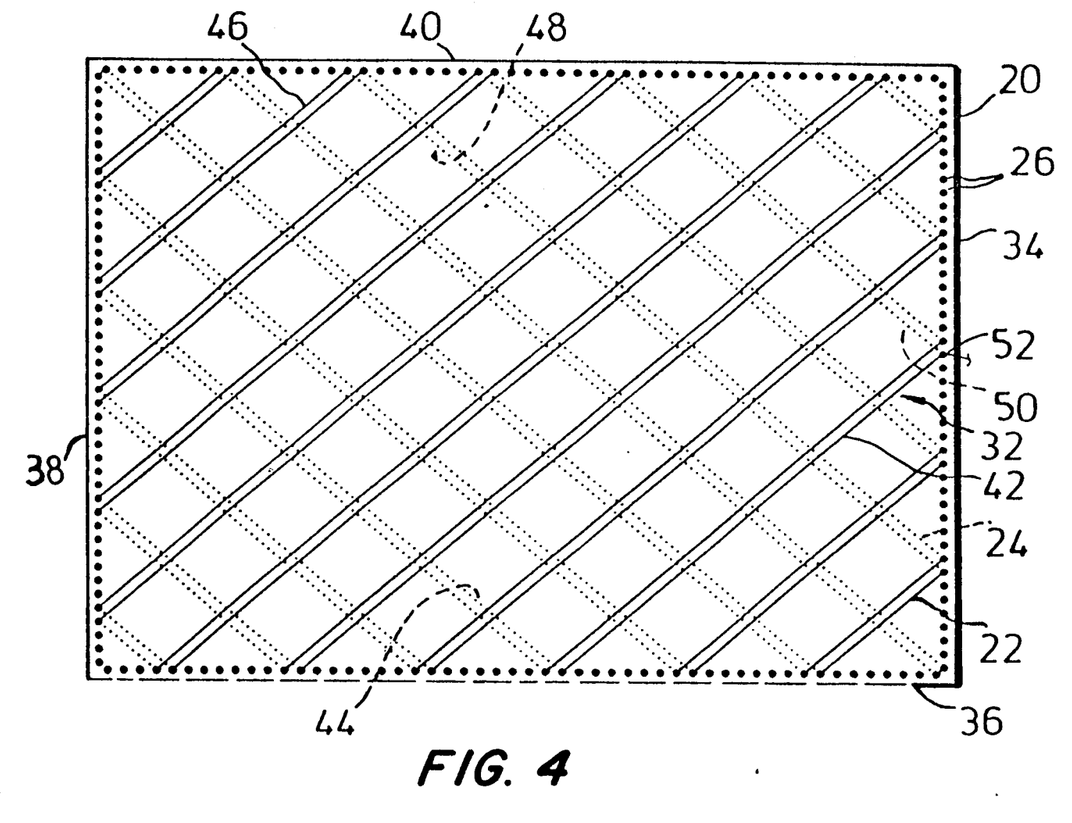
FIG. 4 is a schematic plan view of the sheet of FIG. 1, but only showing one conductor loop formed on the sheet.

FIG. 4 of the drawings illustrates a single conductor or loop 32 from the sheet 20 of FIG. 1, there being a further three available loops which are not shown. In this particular example, the loop 32 has eleven segments, a segment being the portion of a loop which extends from one edge 34 of the sheet via the other three edges 36, 38, 40 and returns to the edge 34: for example, FIG. 4 shows a segment formed of a first line 42, extending from the edge 34 to the edge 36, a second line 44 on the underside of the sheet extending from the edge 36 to the edge 38, a third line 46 extending from the edge 38 to the edge 40, and a fourth line 48 extending from the edge 42 to the edge 34 along the underside of the sheet. This represents the first segment of the illustrated loop 32. The other ten segments are also each defined by individual lines and once any line forming a part of the loop 32 is identified, it is possible to locate the other lines and segments which define the rest of the loop, simply by following the lines between the interconnected pads. Thus following the lines forming the first segment described above and the lines forming the other segments eventually leads to the final line 50 of the last segment of the loop, which extends from the edge 40 to the edge 34 along the underside of the sheet 20 to a pad below the pad 52 which marked the beginning of the first line 42. It will be noted that the pattern defined by the loop 32 is not quite symmetrical on the sheet (about the diagonal axes), and the other three loops also define somewhat different, but equally not quite symmetrical and traceable loops.

The segments all have the same electrical length and most are composed of four lines but some are composed of five lines because they incorporate very short length lines at the corners of the sheet 20. In FIG. 4 48 lines are shared by eleven segments.

Monitoring of the loops is achieved by monitoring the voltage or potential drop between the two ends of each loop. In order to penetrate the sheet without affecting the lines 22, 24, and thus the voltage drops across the loops, it would be necessary to first identify the lines which define each loop and then tap across sections of the lines to produce a hole of sufficient size to gain useful entry to the enclosure.

Figure 5:
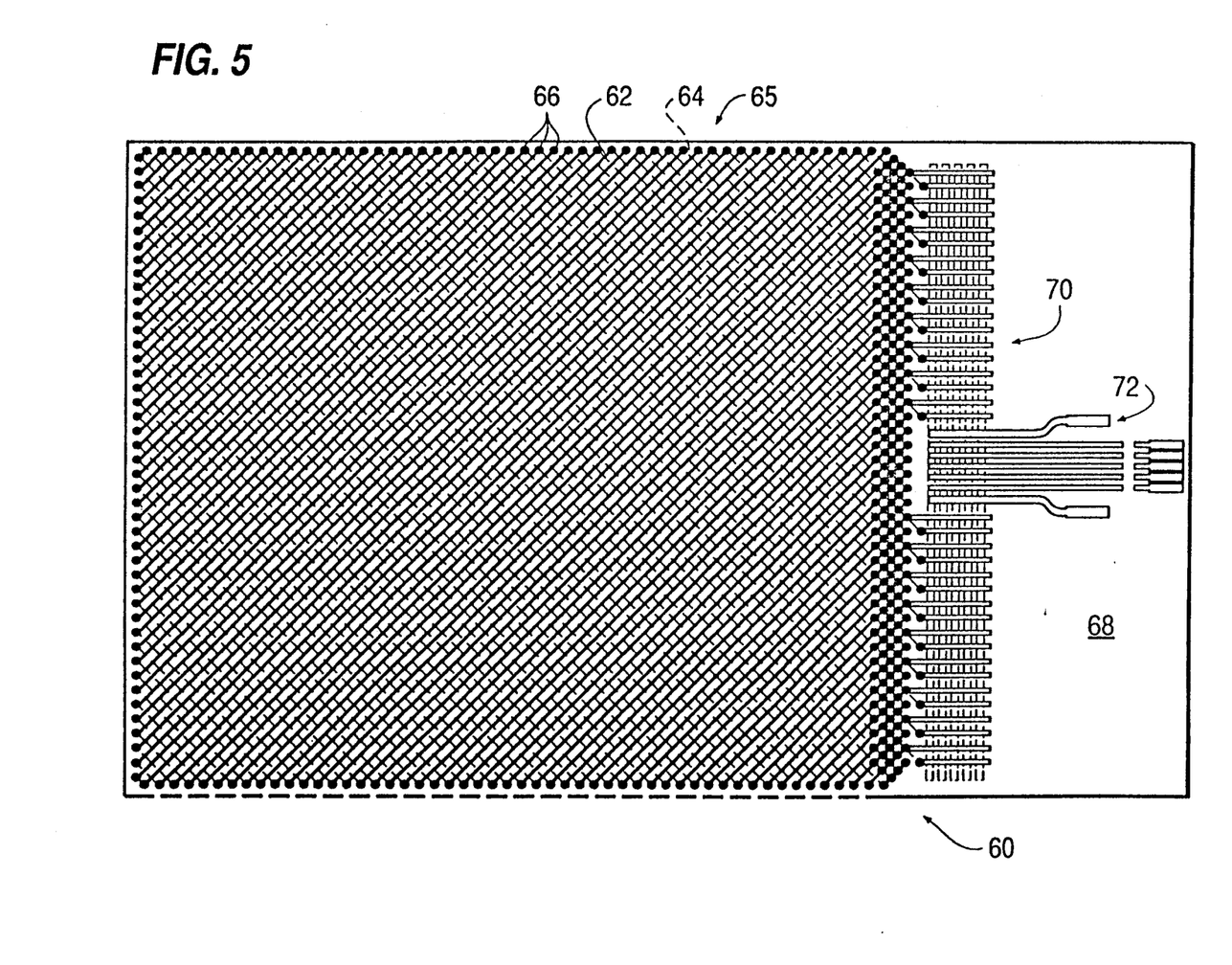
FIG. 5 is a schematic plan view of a flexible sheet for use in forming a security enclosure in accordance with a preferred aspect of the present invention.

Reference is now made to FIG. 5 of the drawings which illustrates a flexible sheet 60 in accordance with a preferred embodiment of the present invention. The sheet 60 is somewhat similar to the sheet 20 described above, comprising a rectangular, thin insulating film provided with a matrix 65 of diagonally extending semi-conductive lines 62, 64 of semi-conductive ink on both faces of the sheet. Similarly, connections between the lines 62, 64 are made via pads 66 which are apertured to provide a connection between the lines on either side of the sheet 60. The sheet 60 of FIG. 5 differs from the sheet 20 described above in the arrangement of the connections between the lines 62, 64 on, in this illustration, the right hand edge portion 68 of the sheet 60 where it may be seen that the end of each line 62, 64 is provided with five pads. Further, the connection between the sheet 60 and the detecting means is through connecting means in the form of a matrix of conducting paths 70 which are connected to connectors 72 for linking with the detecting means. However, before describing the line connections and the detecting means connections, the configuration of the sheet 60 will be described.

Typically, the pads 66 are spaced to produce a matrix of diamond-shaped areas of largest dimension no more than 10 mm. Also, the sheet and lines are further overprinted with a layer of nonconductive ink (not shown), the same colour as the semi-conductive ink used to form the lines 62, 64, so as to conceal the matrix. It is preferred that carbon is used to provide the semi-conducting properties of the matrix, since it is most easily concealed to sophisticated investigation techniques such as x-ray examination. Preferred materials are polyester film for the thin insulating sheet 60, 0.025 mm or less thick, and carbon filled polyester adhesive for the lines 62, 64 and pads 66 applied by screen printing. Typically the lines 62, 64 are 1 mm wide and the pads 66 may be 3 mm in diameter. The carbon will be selected to produce low resistivity for low volume filling. Typically a track may be formed with a resistivity of 6 ohms - cm for a 25% carbon loading in polyester.

The overprinting layer (not shown) would also be a carbon loaded polyester adhesive. In this case the carbon would be chosen to produce high colour (jetness) with low loading and minimum change to electrical resistance. Typically a resistivity higher than $10^{13}$ ohms - cm can be achieved for a 2% loading whilst providing good jetness.

Figure 6A:
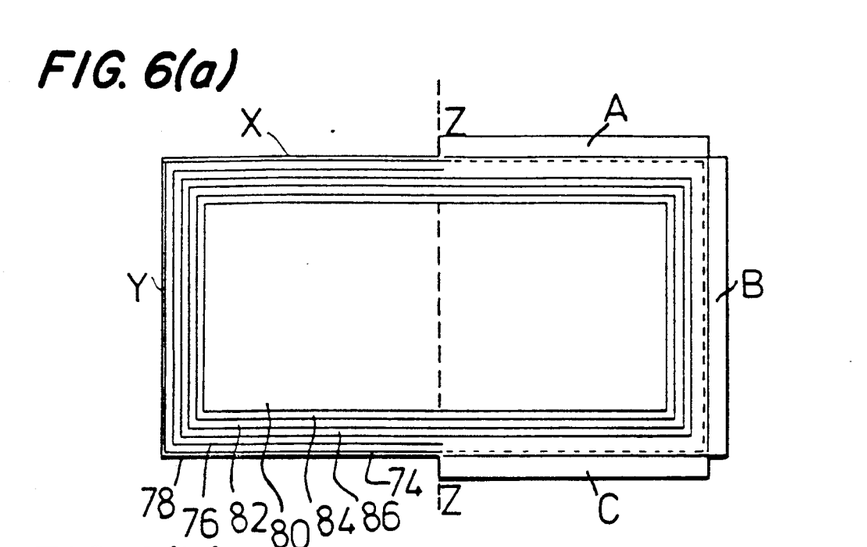
FIGS. 6a, 6b, and 6c are a plan view, an exploded side view and a side elevation, respectively, of a flexible laminate for use in forming a security enclosure.

The laminate for forming the walls of a preferred security enclosure also includes a number of additional layers, as will now be described with reference to FIGS. 6a, 6b and 6c of the drawings. The flexible sheet 60 carrying the lines 62,,64 and the overprinting layers is represented by layer 74 which is sandwiched between two thin insulating films 76, 78, for example of polyester. The upper portion of the sheet comprises two further thin insulating films 80 82 and two layers 84, 86 of semi-conductive fibrous material.

Each semi-conductive layer 84, 86 is made throughout of a fibrous material such that, in use, if a sharp object penetrates the layers the object will pull fragments of the upper semi-conductive layer 84 through the intervening insulating layer 80 to touch, and to make electrical contact with, the lower semi-conductive layer 86. In order to have a high probability of a conductive path being formed, the insulating layer 80 should be thinner than the mean length of the conductive fibres produced by pushing an object through the semi-conductive layer. Thus, the insulating layer 80 should be no thicker than, and preferably is thinner than, the semi-conductive layer. Typically the thickness of the semi-conductive layers 82, 84 may be 0.075 mm, and the thickness of the insulating layers 76, 78, 80, 82 may be no more than 0.025 mm. The preferred semi-conductive fibrous material is unsintered, carbon loaded polytetrafluoroethylene (PTFE) having a volume resistivity of typically from 1 to 10 ohms - cm, and the preferred insulating material is polyester film.

Figure 7:
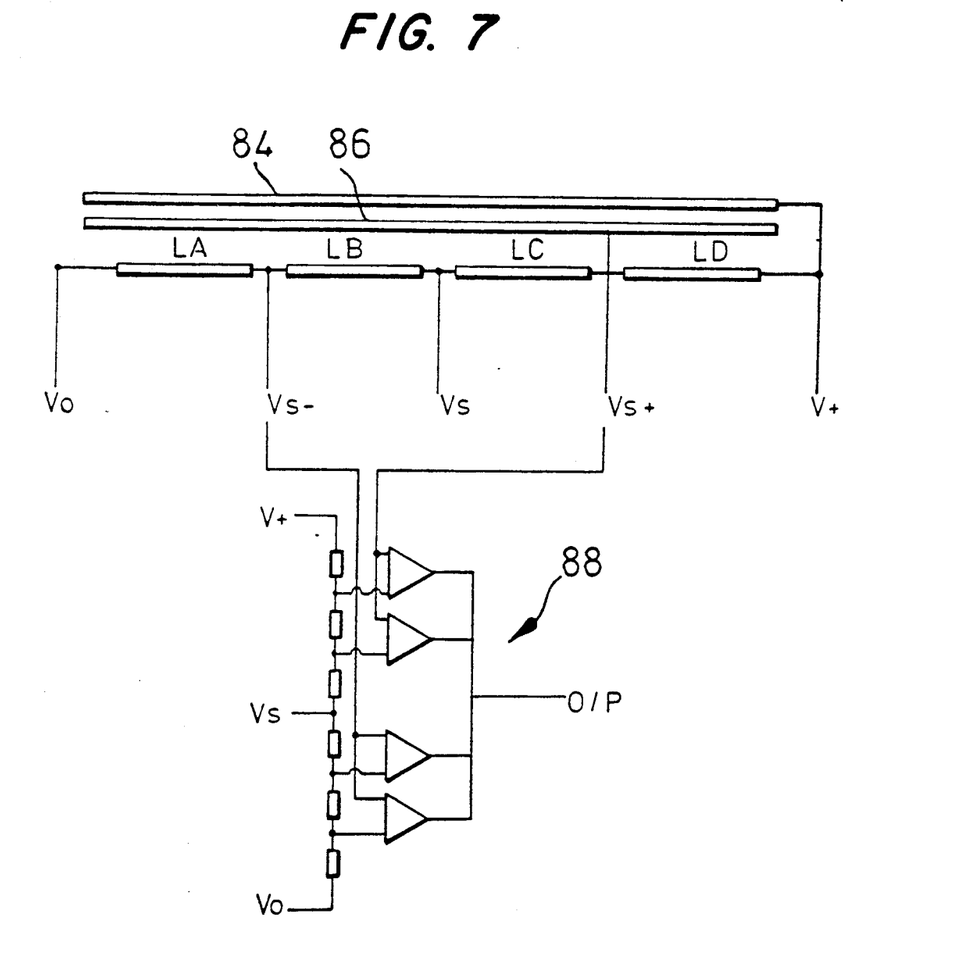
FIG. 7 is a diagram of a circuit for use with the security enclosure formed using the flexible laminate of FIG. 5.

FIG. 7 of the drawings illustrates the circuit which provides the means for detecting changes in the electrical characteristics in the laminate. The semi-conductive layers 84, 86 are shown and the blocks LA, LB, LC, LD represent the four loops formed by the lines 62, 64 printed on the sheet 60. In this particular example the loops are connected in series between reference potentials Vo, Vs and V+. Connections are made between each loop and a comparator circuit 88 which is set to detect any change in the monitored potentials Vs −, Vs+ at, in this particular example, the end of the first loop LA and the beginning of the second loop LB and at the end of the third loops LC and the beginning of the fourth loop LD. The semi-conductive layer 84 is at reference voltage V+ while the second semi-conductive layer 86 is at monitored reference voltage Vs+, in common with the end of the third loop LC and the beginning of the fourth loop LD. Any penetration of the semiconductor layers 84, 86 or loops LA, LB, LC, LD will result in a change in the monitored potentials Vs−, Vs+, creating an output from the comparator circuit 88 which may be passed to a suitable amplifier, to activate an alarm or some other appropriate action.

Figure 8:
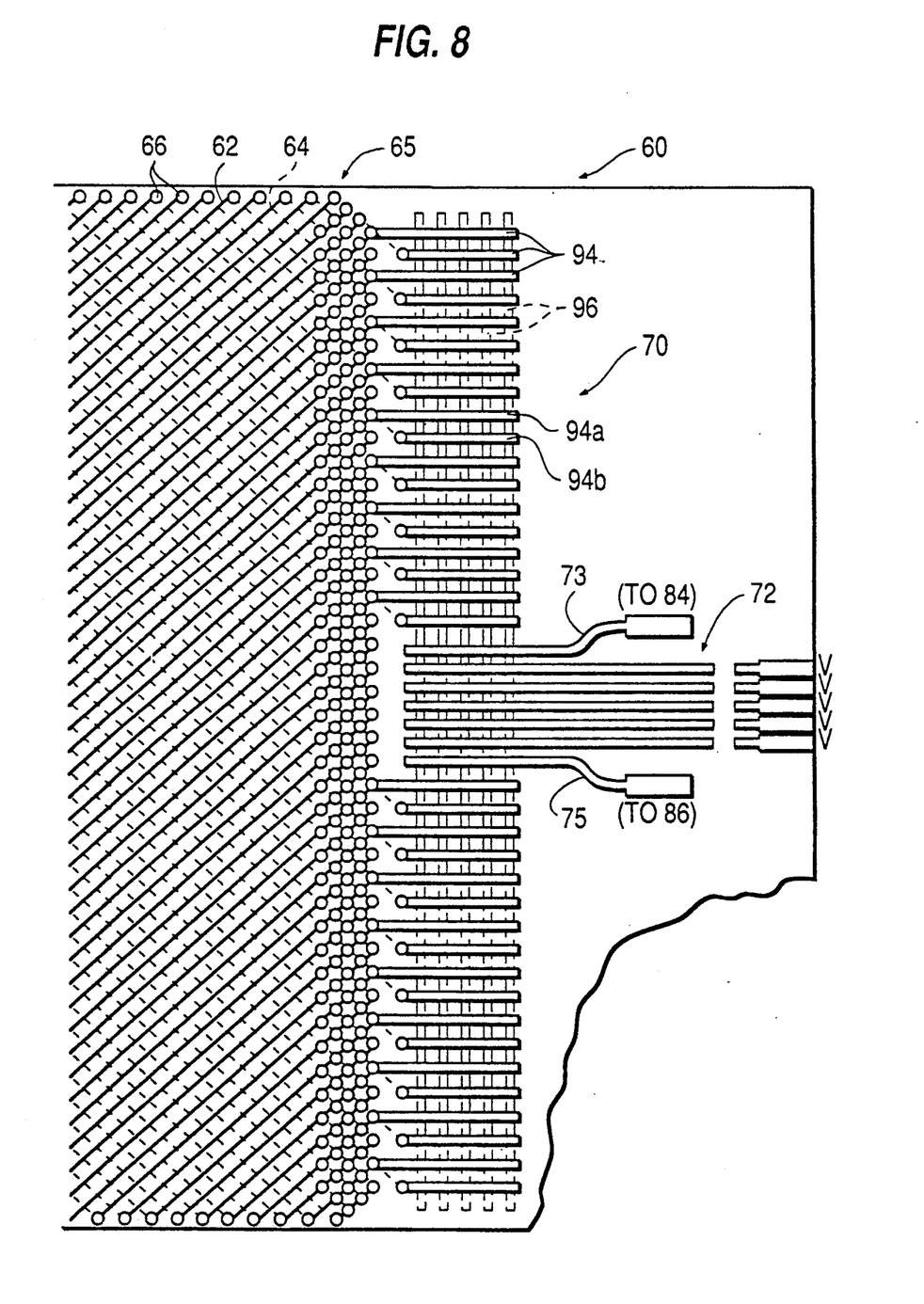
FIG. 8 is an enlarged view of an edge portion of the sheet of FIG. 5.
Figure 9A:
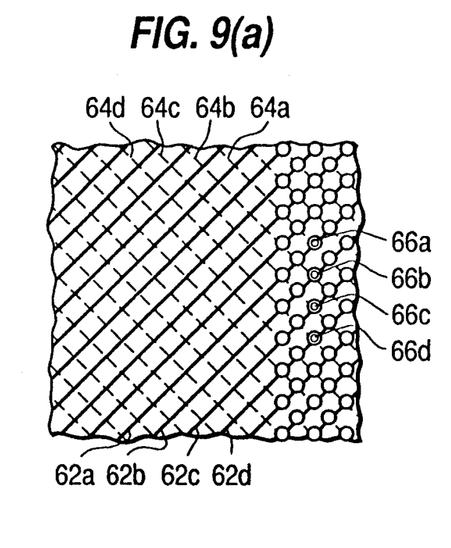
Figure 9B:
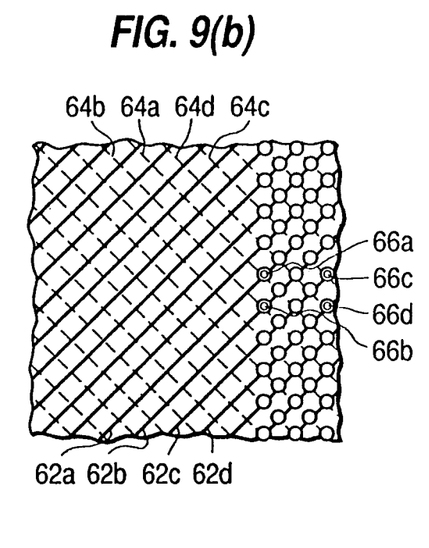
Figure 9C:
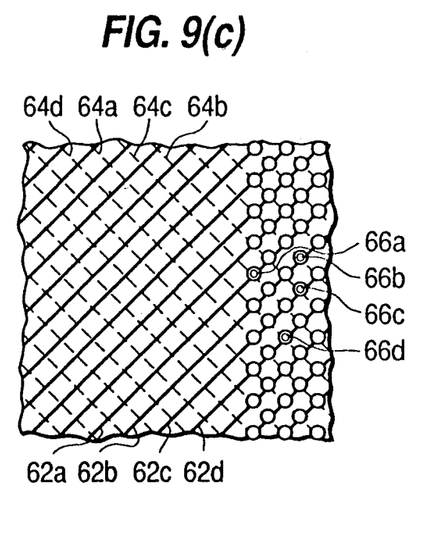
Figure 9D:
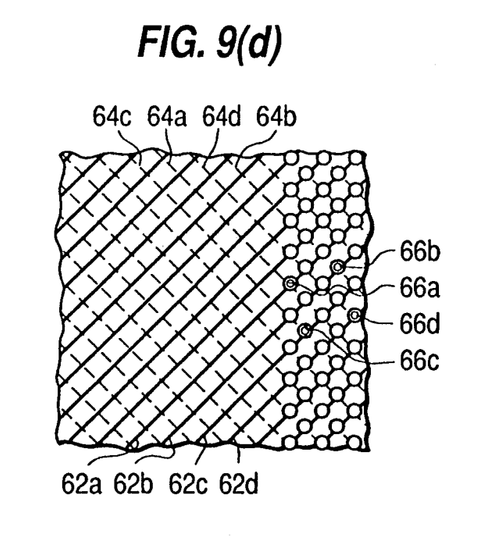
Figure 9E:
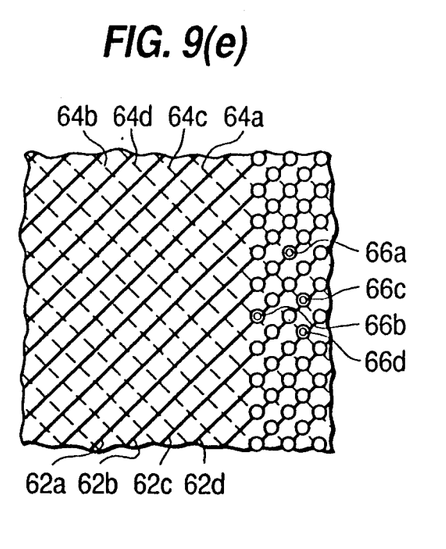
Figure 9F:
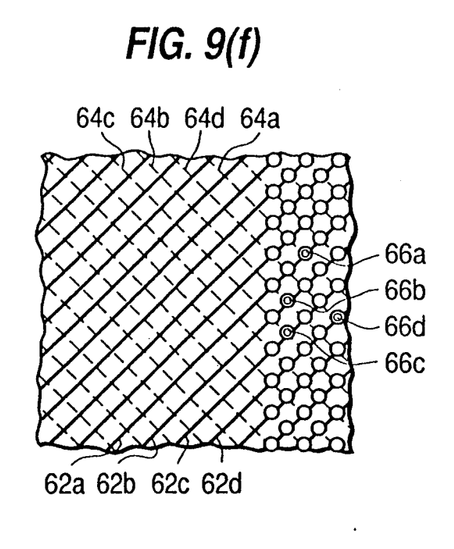

Referring once more to FIG. 5, and also FIG. 8 of the drawings the conducting paths 70 comprise, with reference to this particular illustration, a series of longitudinal paths 94 on the upper surface of the sheet 60 and a series of lateral paths 96 on the underside of the sheet. The lateral paths 96 pass beneath the connectors 72 and electrical connection between selected ones of the connectors 72 and the lateral conducting paths 96 are made in the same manner as the connections at the pads, that is by forming a hole through the sheet at the intersection of the paths 96 and connectors 72 and printing one of the tracks such that the conducting ink extends through the hole to form a connection between the tracks. Connections between the lateral paths 96 and the longitudinal paths 94 are achieved by the same means. Further connectors 73, 75 are also provided on either side of the connectors 72 for providing an electrical connection between the matrix 70, of conducting paths 94, 96 the connectors 72, and the two semi-conductive layers 84, 88 of the laminate incorporated in the sheet 60, as will be described.

The longitudinal conductive paths 94 alternate between longer paths 94a which extend to contact the pads 98 at the extreme edge of the matrix 65 and shorter paths 94b which terminate in pads directly above pads provided at the ends of alternate conductive lines 64 on the underside of the sheet 60.

It will be noted that there are a great number of possible connections which may be made between the paths 94, 96 and the matrix 65. This facility allows the manufacturer to vary the connections between the matrix 65 and the paths 94, 96 and thus the connections between the matrix 65 and the connectors 72. Thus, if reference is also made to FIG. 7, each of the loops LA, LB, LC, LD could be represented by any one of many configurations of lines 62, 64 on the sheet and thus it would be extremely difficult for an intruder to predict the path of a particular loop, and its particular reference potentials from an examination of even a large number of enclosures provided with similar sheets.

To allow use of a similar comparator circuit 88 for each sheet produced it is necessary that the total length of each loop, however formed on the sheet, be of similar length such that the resistance or change in potential across each loop is the same and the loops may therefore be "located" in any desired position relative to the comparator circuit 88.

The above described feature allows the location of loops to be varied for different sheets, though the actual path of the loops, once the location of the initial connections has been selected, would be a predictable path if this feature was used in conjunction with a simple four loop sheet, such as was illustrated and described with reference to FIGS. 1-4. The configuration of the edge portion 68 of the matrix 65 further provides for the configuration of loops to be varied, and forms a further aspect of the present invention. This feature is perhaps most clearly illustrated in FIG. 9 of the drawings, which shows six different configurations for "incoming" lines 62a, 62b, 62c, 62d on the upper side of the sheet and four "outgoing" lines 64a, 64b, 64c, 64d on the underside of the sheet 60, when connections between the lines are made and different pads 66a, 66b, 66c, 66d.

When combined with the matrix of connecting paths 70 this feature allows many permutations of loops to be provided, each loop being at one of four different reference potentials.

Figure 10:
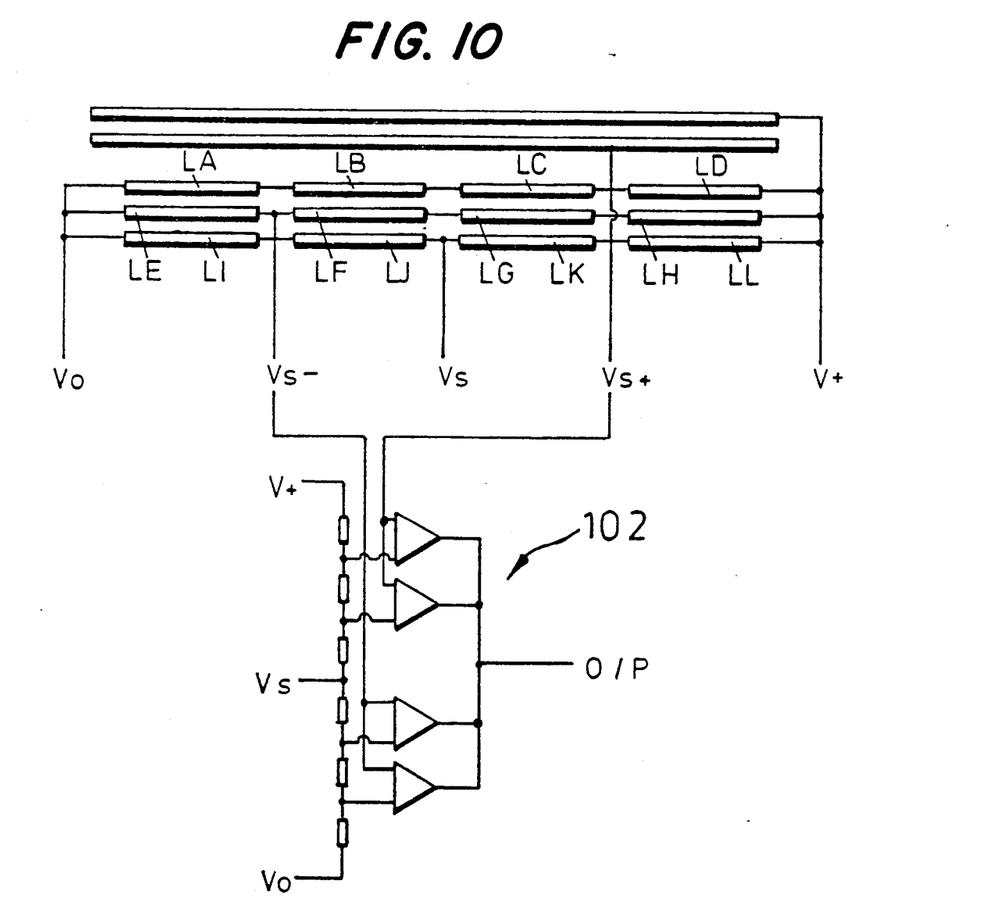
FIG. 10 is a diagram of a circuit for use with a security enclosure incorporating a flexible sheet in accordance with the present invention.

Although the use of a four loop system is described above, larger numbers of loops may be provided to allow for a greater density of lines for a given area or to allow sheets of greater area to be utilised. Such a system could employ a similar connector and comparator configuration, as described above, and a suitable comparator circuit 102 is shown in FIG. 10 of the drawings, which shows the monitoring circuit for a twelve loop sheet. It will be noted that the actual comparator circuit 102 is identical to the circuit 88 described above with reference to FIG. 7, though rather than having a reference potential at the beginning and end of each loop, a number of loops, such as LA, LB and LC, and loops LF, LG and LH are connected in series, which may be readily accomplished through use of the pads on the right hand edge portion 68 of a sheet using a pad arrangement as described above.

A completed security enclosure may be formed in the following way.

Figure 6B:
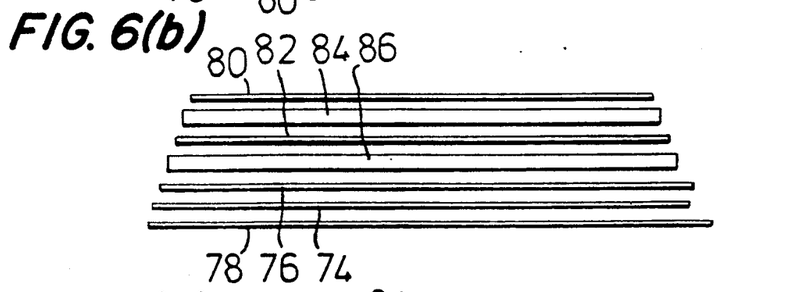
Figure 6C:
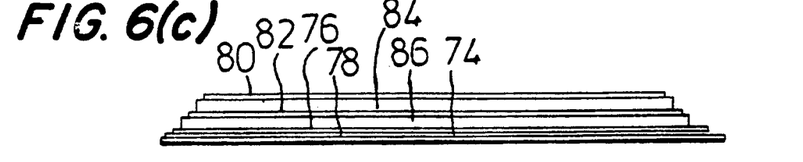

First the rectangular component parts are assembled in the order shown in FIG. 6b.

It will be seen that dimensions in the drawings are exaggerated for clarity and that the sizes of the layers increase successively towards the lowermost layer 78. The edges of the layers in the laminate are thus stepped downwardly and it will be noted, from FIG. 6a that the lowermost insulating film layer 78 is provided with a flap B at one end and side flaps A and C extending from the flap end to the centre line Z—Z bisecting the respective sides. It will also be noticed that the corresponding half of the insulating film layer 76 has its edges extended sufficiently to cover the corresponding edges of the layer 78. Also, although not shown, along one edge of the laminate a portion of the insulating layer is cut-away to allow electrical connection between the connector for the semi-conductive layer 86 and the layer 74 itself, and at another area a portion of the insulating layers 76, 82 and the semi-conductive layer 86 must be cut away to allow electrical connection between the connector for the layer 84 and the layer 74.

Figure 11:
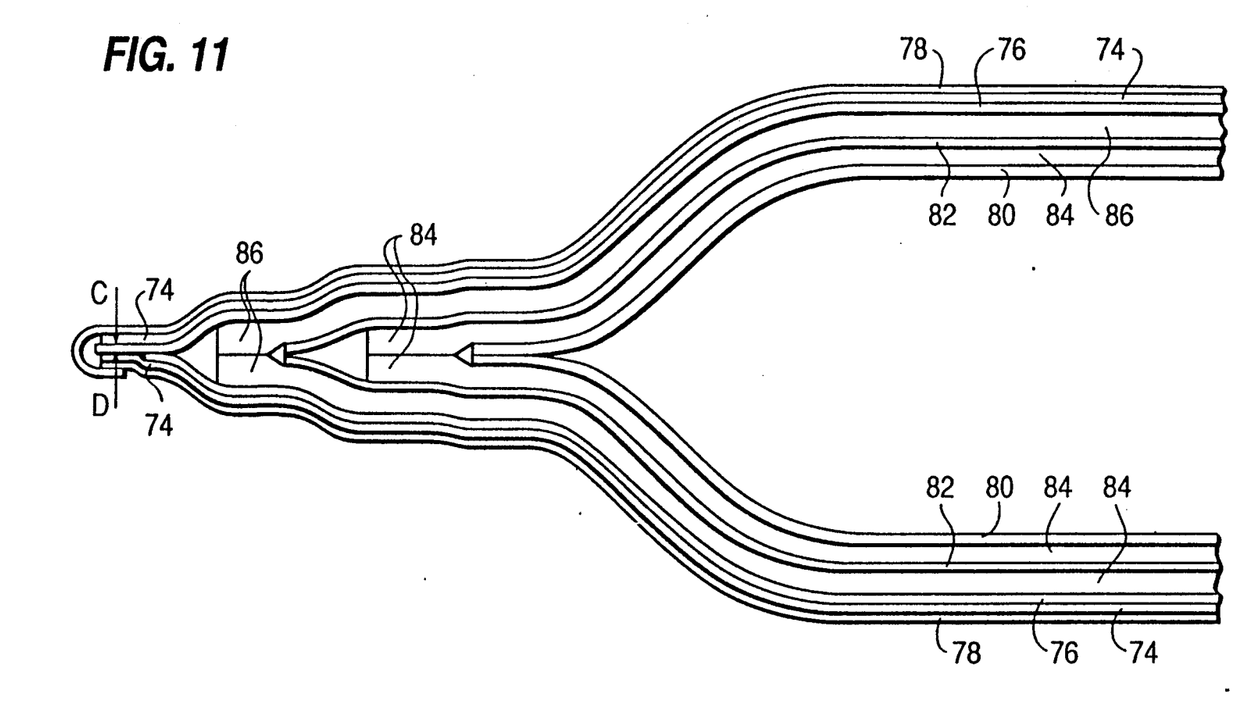
FIG. 11 is a partial cross-section of an edge of a completed security enclosure formed with the laminate shown in FIG. 6.

The flat laminate so produced is folded along the centre line Z—Z and, after further adhesive has been applied along the edges X and Y of the lowermost three layers 74, 76, 78, is sealed along these edges X and Y. Flaps A and B are folded over to mechanically complete this stage and thus make an open ended bag or envelope. FIG. 11, shows the arrangement at one of the sealed edges.

Since the matrix layer 74 extends very close to the edges of the completed enclosures and the two sides of the matrix layer 74 make the final bond at points marked C and D and are separated only by one thin layer 76 of insulation, any attempt to prise open the edge will result in breaking the circuit on the matrix layer 74. The adhesive used for laminating and bonding the edges, and the adhesive used in the semi-conductive ink on the matrix may be identical, and therefore any solvents used to dissolve the edge adhesive will also dissolve the matrix lines 62, 64. Alternatively, the adhesive used in the semi-conductive ink may be selected to be chemically different from the adjacent adhesive layers, in order to minimise carbon migration from the lines to the adhesive layers, which migration results in a rise in electrical resistance in the lines. Also, due to the carbon filling of the ink on the matrix, this bond has a lower tensile strength and elongation compared to the other adhesives used which are not loaded to the same degree by additional solids, and thus any attempt to delaminate the layers should result in the lines breaking and fragmenting before there is separation of any layers held together by adhesive. Further protection against delamination may be provided by placing a layer of low tensile strength material between the lines and the insulating layer, which results in the lines being broken and separated from the insulating layer should an attempt be made to separate the layers of the sheet.

Termination of the semi-conductive lines 62, 64 of the layer 74 to an electronic monitor board included within the enclosure will vary according to the application. Preferably, the electrical monitor circuit will be as in FIG. 7 of the drawings.

Thus the enclosure is protected from both piercing and from tearing.

Connection of the monitor board carrying the comparator circuit may be achieved by folding the edge portion 68 inside the enclosure and the ends of the connectors 72 terminated to the appropriate parts of the monitor board using conductive adhesive.

In the simplest use of the security enclosure, for example to carry security sensitive papers or magnetic media, the items to be secured are placed in the enclosure beside the monitor circuit and the open end sealed thermally. The flap C (see FIG. 6a) is folded over and sealed to provide mechanical strength to the edge joint.

During this operation the circuit has been maintained in the enclosure layers and therefore from the point of switching the monitor "on" and completion of the sealing operation, there has not been any disturbance to the electrical circuit. After a time period or when the enclosure reaches its final destination and is to be opened, it is of course essential to verify that the enclosure integrity has been maintained since it was sealed. This may be done in several ways; an elapsed time indicator may be fitted to the output of the monitor which would start running from the time an interception was detected. This of course would also start at the time the enclosure was finally opened but immediately checking the indicator would verify any interception during transit. An alarm of course may be fitted to activate as soon as an interception was detected. Both methods will indicate, in a nondestructive way, that the enclosure has been intercepted.

In addition, a destructive alarm may be connected with the detector device. This will take the form of an erasure device which will activate either, after a short delay to allow the intended recipient to remove the contents, or immediately. In the later case it is necessary to switch "OFF" the detector from the outside of the enclosure prior to opening.

Connection through the wall of the enclosure is also necessary when the device to be secured has to be simultaneously connected to another system. Non contact connection may be made using an inductive coupler device, one half being mounted on the inner surface of the enclosure, the other brought close to this position on the other side. The detector circuit can therefore be "questioned" about the time period between sealing and the present.

In some other circumstances it may be preferred to make direct connection to the contents of the enclosure. Very low profile connectors exist which have plastic one-pieced bodies, such as Moulinex (trademark) 70430 Series Connectors. This type of connector may be bonded into the edge of the enclosure without compromising its integrity, and the above mentioned U.K. patent application describes the mounting of such a connector in a similar form of security enclosure.

Thus, it will be noted that the above described sheet may be utilised to produce security enclosures which, even with the most sophisticated techniques and from examination of enclosures provided with similar sheets, would prove very difficult to penetrate.

It will be clear to those of skill in the art that the above description is merely exemplary of a preferred embodiment of the present invention and that various modifications and improvements may be made to the sheet without departing from the scope of the invention.

I claim:

1. A security enclosure comprising:
   flexible sheet of insulating material extending over the whole of the area of the enclosure and carrying lines of electrically responsive material on each side thereof, the lines on one side of the sheet extending obliquely relative to the lines on the other side and being connected thereto at edge portions of the sheet to form a plurality of conductors so dividing the sheet into a number of relatively small areas that an attempted opening of the enclosure changes an electrical characteristic of the conductors;
   detecting means for detecting said change and having connectors; and
   connecting means carried on an edge portion of the sheet for individually connecting the conductors to the detecting means, the connecting means including switch means for selectively configuring the connections between the connectors associated with the detecting means and selected conductors.

2. The security enclosure of claim 1 wherein each conductor is subject to a particular, monitored reference potential.

3. The security enclosure of claim 1 wherein each detecting means connector is associated with a single conductor.

4. The security enclosure of claim 1 wherein each detecting means connector is associated with a plurality of conductors.

5. The security enclosure of claim 4 wherein the switch means is configured to interconnect a plurality of different conductors such that a single detecting means connector serves a plurality of conductors and the detecting means monitors an electrical characteristic of the interconnected conductors.

6. The security enclosure of claim 1 wherein the lines of electrically-responsive material are of semi-conductive material.

7. The security enclosure of claims 1 wherein the lines of electrically-responsive material are arranged in generally parallel arrays and thus divide the sheet into a matrix of generally diamond shaped areas.

8. The security enclosure of claim 1 wherein the lines on one side of the sheet are connected to the lines on the other side of the sheet at spaced points along the edges of the sheet, the points on one side of the sheet being in register with the points of the other side of the sheet.

9. The security enclosure of claim 8 wherein the lines on opposite sides of the sheet are interconnected at each pair of registering points by a semi-conductive or conductive material extending through a hole formed through the sheet and the registering points.

10. The security enclosure of claim 1 wherein the connecting means comprises a series of longitudinal lines on one side of the sheet and a series of lateral lines on the other side of the sheet, the connectors being formed by longitudinal lines on said one side of the sheet, the connections between the longitudinal and lateral lines and between the lateral lines and the connector lines being provided by a semi-conductive or conductive material extending through a hole formed through the sheet at the intersection of the lines.

11. The security enclosure of claim 1 in which the conductors each have the same electrical characteristics.

12. The security enclosure of claim 1 wherein the detecting means applies a reference potential to each conductor and each conductor is of the same electrical length to provide a standard potential difference between the ends of each conductor to permit a single form of detecting means to be utilised on different security enclosures with differently configured switch means.

13. A security enclosure comprising a flexible sheet of insulating material extending over the whole of the area of the enclosure and carrying lines of electrically-responsive material on each side, the lines on one side extending obliquely relative to the lines on the other side and the lines being interconnected at edge portions of the sheet to form a plurality of conductors so dividing the sheet into a number of relatively small areas that attempted opening of the enclosure changes an electrical characteristic of the conductors, one edge portion of the sheet including a plurality of line switch means which are selectively configured to connect each one of the lines on one side of the sheet with a selected one of a plurality of lines on the other side of the sheet; means for detecting said changes; and connecting means for connecting ends of the conductors to the detecting means.

14. The security enclosure of claim 13 wherein the lines on one side of the sheet are connected to the lines on the other side of the sheet at spaced points along the edges of the sheet, the points on one side of the sheet being in register with the points on the other side of the sheet.

15. The security enclosure of claim 14 wherein at the edge portion of the sheet provided with line switch means, each line on one side of the sheet overlies a plurality of lines on the other side of the sheet, a point being provided on each side of the sheet at the location of each overlap, but only one point on each line providing a connection.

16. The security enclosure of claim 15 wherein the lines on opposite sides of the sheet are interconnected at each pair of connected registering points by a semi-conductive or conductive material extending through a hole formed in the sheet at the registering points.

17. The security enclosure of claim 13 wherein edges of the sheet are overlapped and joined together to define the enclosure, and at least at said joined edges at least one layer of insulating material separates the lines of electrically-responsive material on the respective edges and adhesive is used to join the edges and the layer of insulating material, the lines of electrically-responsive material being carbon loaded material and selected to be chemically different from the adjacent adhesive layers to minimise carbon migration from the lines to the adhesive layers.

18. The security enclosure of any one of claim 13 wherein edges of the sheet are overlapped and joined together to define the enclosure, and at least at said joined edges at least one layer of insulating material separates the lines of electrically-responsive material on the respective edges and adhesive is used to join the edges and the layer of insulating material, and the material forming the lines of electrically-responsive material has lower tensile strength and elongation compared with adjacent adhesive layers and any attempt to delaminate the layers results in the lines breaking and fragmenting before there is separation of any layers held together by adhesive.

19. The security enclosure of any one of claim 13 wherein edges of the sheet are overlapped edges of the sheet are overlapped and joined together to define the enclosure, and at least at said joined edges at least one layer of insulating material separates the lines of electrically-responsive material on the respective edges and adhesive is used to join the edges and the layer of insulating material, and further comprising a lower tensile strength material between the lines and the flexible sheet so that the lines are broken and separated from the sheet should an attempt be made to separate the layers of the enclosure.

20. The security enclosure of claim 13 wherein the connecting means include a plurality of further switch means which are selectively configured to connect the connectors associated with the detecting means with selected conductors.

21. A method of forming a laminate for use in forming a security enclosure comprising the steps:
  (a) providing a flexible sheet of insulating material carrying lines of electrically responsive material on each side, the lines on one side extending obliquely relative to the lines on the other side and being connected thereto at edge portions of the sheet to form a plurality of conductors so dividing the sheet into a number of relatively small areas that attempted penetration of the sheet changes an electrical characteristic of the conductors;
  (b) providing connectors on an edge portion of the sheet for connection to detection means for detecting said change in electrical characteristic;
  (c) providing means on said edge portion of the sheet for individually connecting the conductors to said connectors, the connecting means including switch means for switching selectively the configuration of connections between said connectors and said conductors; and
  (d) configuring said switch means to connect selected conductors with selected connectors.

22. A method of forming a laminate for use in a security enclosure comprising the steps:
  (a) providing a flexible sheet of insulating material carrying lines of electrically-responsive material on each side, the lines on one side extending obliquely relative to the lines on the other side and the lines being interconnected at edge portions of the sheet to form a plurality of conductors so dividing the sheet into a number of relatively small areas that attempted penetration of the sheet changes an electrical characteristic of the conductors;
  (b) providing a plurality of line switch means on one edge of the sheet configurable to connect lines on one side of the sheet with one of a plurality of lines on the other side of the sheet; and
  (c) selectively configuring said line switch means to connect each of said lines on one side of the sheet with a selected one of said plurality of lines on the other side of the sheet.

* * * * *